US007701488B2

(12) United States Patent
Chen et al.

(10) Patent No.: US 7,701,488 B2
(45) Date of Patent: Apr. 20, 2010

(54) SYSTEM FOR CAMERA POSITIONING AND METHODS THEREOF

(75) Inventors: Chi-Farn Chen, Taipei (TW); Li-Yu Chang, Pingjhen (TW); Bing-Cyuan Lai, Jhongli (TW)

(73) Assignee: National Central University, Jhongli, Taoyuan (TW)

( * ) Notice: Subject to any disclaimer, the term of this patent is extended or adjusted under 35 U.S.C. 154(b) by 903 days.

(21) Appl. No.: 11/503,266

(22) Filed: Aug. 14, 2006

(65) Prior Publication Data

US 2007/0296823 A1    Dec. 27, 2007

(30) Foreign Application Priority Data

Jun. 22, 2006    (TW)    ............................... 95122437 A

(51) Int. Cl.
*H04N 5/232*    (2006.01)
(52) U.S. Cl. ............................... 348/211.9; 348/211.99
(58) Field of Classification Search ........................ None
See application file for complete search history.

(56) References Cited

U.S. PATENT DOCUMENTS

| | | | | |
|---|---|---|---|---|
| 5,598,209 A | * | 1/1997 | Cortjens et al. | 348/211.12 |
| 6,437,819 B1 | | 8/2002 | Loveland | 348/143 |
| 6,698,021 B1 | | 2/2004 | Amini et al. | 725/105 |
| 6,816,184 B1 | * | 11/2004 | Brill et al. | 348/143 |
| 6,867,799 B2 | | 3/2005 | Broemmelsiek | 348/169 |
| 6,891,566 B2 | | 5/2005 | Marchese | 348/211.3 |
| 2002/0067412 A1 | * | 6/2002 | Kawai et al. | 348/211 |
| 2002/0097322 A1 | * | 7/2002 | Monroe et al. | 348/159 |
| 2003/0202101 A1 | * | 10/2003 | Monroe et al. | 348/156 |
| 2005/0261849 A1 | * | 11/2005 | Kochi et al. | 702/85 |
| 2006/0008175 A1 | * | 1/2006 | Tanaka et al. | 382/276 |

OTHER PUBLICATIONS

S. Sinha, M. Pollefeys. Towards Calibrating a Pan-Tilt-Zoom Cameras Network, OMNIVIS 2004, ECCV Conference Workshop CD-rom proceedings, 2004.*
B. Triggs, P. McLauchlan, R. Hartley, and A. Fitzgibbon. Bundle adjustment—a modern synthesis. In Proceedings of the International Workshop on Vision Algorithms: Theory and Practice, pp. 48-49, Corfu, Greece, Sep. 1999.*

* cited by examiner

*Primary Examiner*—Jason Whipkey
*Assistant Examiner*—Dennis Hogue
(74) *Attorney, Agent, or Firm*—Jackson IPG PLLC

(57) ABSTRACT

A system is used to remotely control camera positioning. A transformation model is used. By in putting image coordinates of the monitored position form camera, the object coordinates is obtained and displayed on a digital map. By inputting object coordinates on a digital map, image coordinates for the camera is obtained. After transferring parameters for camera positioning, the camera is moved to a desired position for monitoring an area and taking a photo.

2 Claims, 4 Drawing Sheets

SYSTEM FOR CAMERA POSITIONING AND METHODS THEREOF

FIELD OF THE INVENTION

The present invention relates to camera positioning; more particularly, relates to transforming between image coordinates of a remote-control camera and object coordinates of a digital map by using a transformation module between the coordinates of the remote-control camera and the coordinates of the digital map.

DESCRIPTION OF THE RELATED ARTS

A first prior art proclaimed in Taiwan is called "A method for a monitoring camera", comprising steps of: (a) notifying a happening of an accident to a control center by an alarm; (b) transforming and transferring position coordinates of the accident from a database in the control room; (c) figuring out a relationship function to obtain polar position coordinates for camera controlling commands; (d) controlling a camera on a rotating platform; and (e) transferring an image of the position for the accident back to the control center. Thus, a control center is able to monitor a large are a by controlling cameras remotely.

A second prior art, "A three-dimensional monitoring system controlled with a map", is revealed in Taiwan for monitoring a selected target in a monitored area. The system comprises camera devices and a control device, where the camera devices are cameras distributed in the monitored area capable of taking picture at any angle by rotating; the control device comprises a system main frame and a display; the system main frame has a digital map set; and the digital map set provides at least one digital map shown on the display. When the control device receive a control command from the digital map to select a target, a rotating signal is transferred to control cameras to take photos at the target from different directions. Every image signal from camera is transferred back to form a three-dimensional image of the target shown on the display.

Although the monitored area is watched out through the above prior arts, the general remote-control camera has no calibrated parameters of panning, tilting and zooming and so positioning faces some difficulties. Hence, the prior arts do not fulfill users' requests on actual use.

SUMMARY OF THE INVENTION

The purpose of the present invention is to transforming between image coordinates of a remote-control camera and object coordinates of a digital map by using a transformation module in between.

To achieve the above purpose, the present invention is a system for camera positioning and methods thereof. The system for camera positioning comprises a camera device and a control device, where the camera device has a remote-control camera with parameters of panning, tilting and zooming; the control device comprises a control unit and a display unit; the control unit comprises an input/output (I/O) module, an image database module, a transformation module and a digital map module; the transformation module has a transformation function between image coordinates of the remote-control camera and object coordinates of a digital map in the digital map module; and the object coordinates of the digital map is obtained through inputting the image coordinates of the remote-control camera or, likewise, the image coordinates of the remote-control camera is obtained through inputting the object coordinates of the digital map. Accordingly, a novel system for camera positioning and methods thereof are obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the structural view showing the preferred embodiment according to the present invention;

DESCRIPTION OF THE PREFERRED EMBODIMENT

The following description of the preferred embodiment is provided to understand the features and the structures of the present invention.

Figure 1:
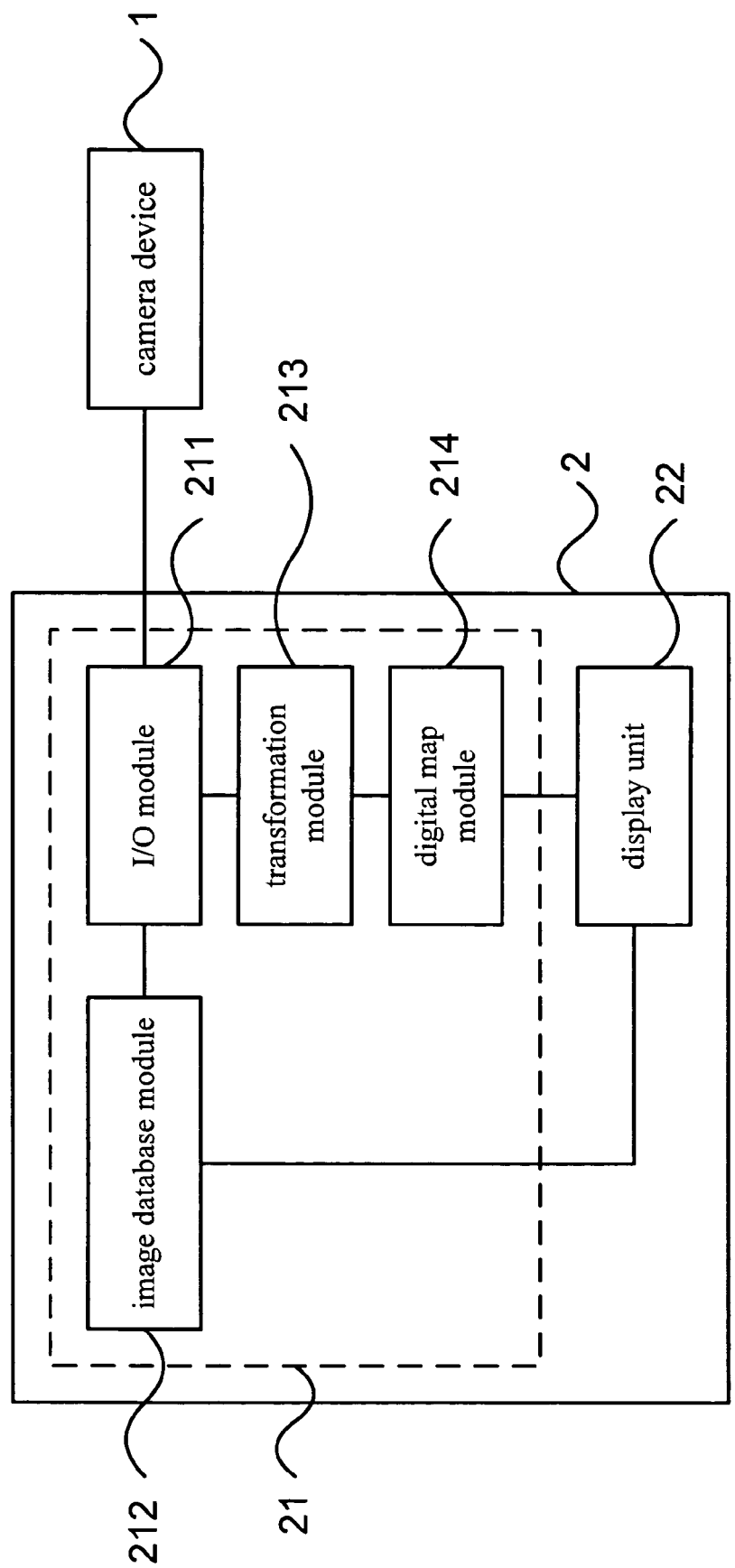

Please refer to FIG. 1, which is a structural view showing a preferred embodiment according to the present invention. As shown in the figure, the present invention is a system for camera positioning and methods thereof. The system for camera positioning comprises a camera device 1 and a control device 2, where the camera device 1 comprises a remote-control camera and the remote-control camera has parameters of panning, tilting and zooming.

The control device 2 comprises a control unit 21 and a display unit 22, where the control unit 21 comprises an input/output (I/O) module 211, an image database module 212, a transformation module 213 and a digital map module 214; the control unit 21 is a computer; the display unit 22 displays image data and digital map; and the display unit 22 is a liquid crystal display (LCD).

Figure 2:
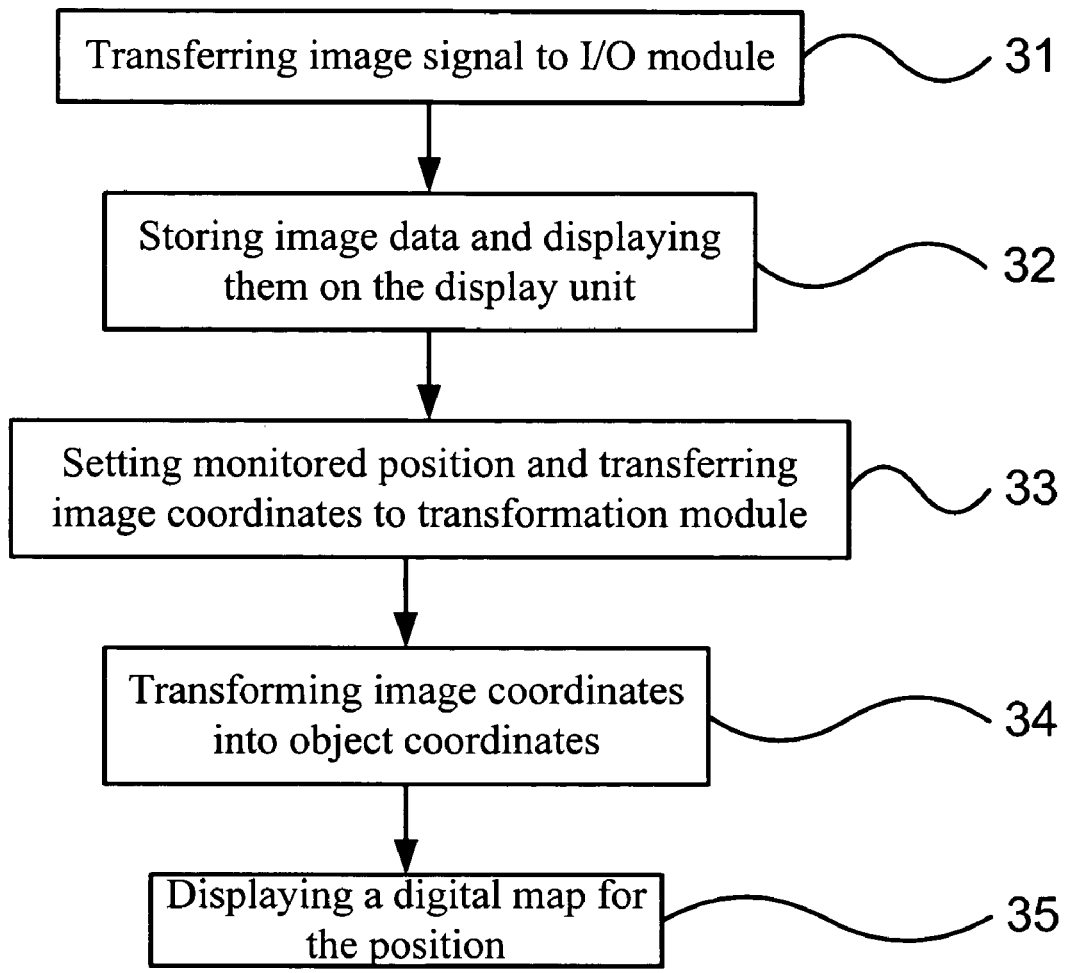
FIG. 2 is the flow view showing the method for positioning on the digital map.

Please refer to FIG. 1 and FIG. 2, which are the structural view and a flow view showing a method for positioning on a digital map according to the present invention. As shown in the figures, the system for camera positioning has a method for positioning on a digital map, comprising the following steps:

(a) Transferring an image signal to an I/O module 31: The camera device 1 transfers an image signal to an I/O module 211 of a control device 2; and the I/O module 211 transforms the image signal into image data.

(b) Storing image data and displaying image data on the display unit 32: The image data is transferred to the image database module 212 to be stored; and the image data is transferred to the display unit 22 to be displayed.

(c) Setting a monitored position and transferring image coordinates of the monitored position to a transformation module 33: A monitored position is set in the image data; and image coordinates of the monitored position are transferred to a transformation module 213.

(d) Transforming the image coordinates into object coordinates 34: The transformation module 213 transforms the image coordinates of the monitored position into object coordinates to be used in a digital map module 214.

(e) Displaying a digital map for the position 35: The object coordinates of the monitored position is inputted to the digital map module 214 for positioning; and both the monitored position and a digital map are transferred to be displayed on the display unit 22.

Figure 3:
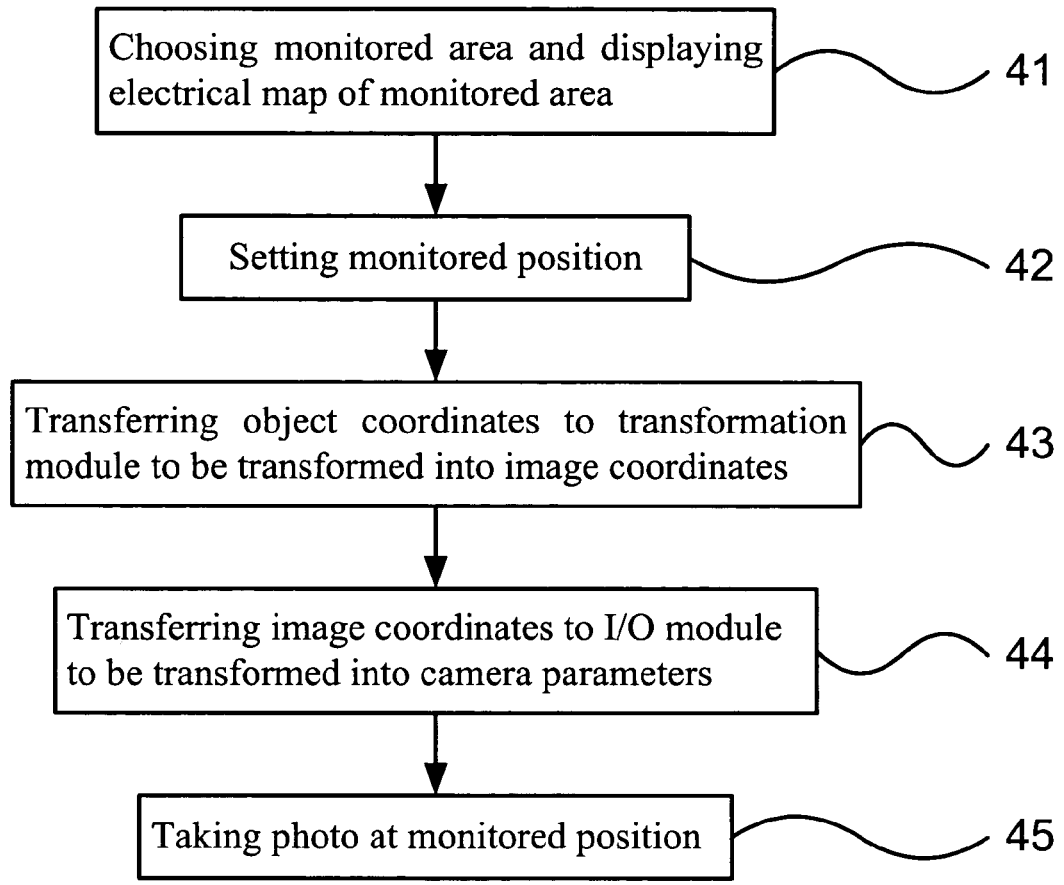
FIG. 3 is the flow view showing the method for positioning the remote-control camera.

Please refer to FIG. 1 and FIG. 3, which are the structural view and a flow view showing a method for positioning a remote-control camera according to the present invention. As shown in the figures, the system for camera positioning has a method for positioning a remote-control camera, comprising the following steps:

(f) Choosing a monitored area and displaying a digital map of the monitored area 41: A monitored area is chosen from a digital map module 214; and a digital map of the monitored area is displayed on a display unit 22.

(g) Setting a monitored position 42: A monitored position is set in the monitored area.

(h) Transferring object coordinates to a transformation module to be transformed into image coordinates 43: Object coordinates of the monitored position are transferred to a transformation module; and is transformed into image coordinates to be used by the camera.

(i) Transferring image coordinates to an I/O module to be transformed into camera parameters 44: The image coordinates of the monitored position are transferred to an I/O module 211 to be transformed into parameters of panning, tilting and zooming for a remote-control camera.

(j) Taking photo at the monitored position 45: The three parameters are transferred for positioning the remote-control camera so that a photo at the monitored position is taken with the remote-control camera.

Figure 4:
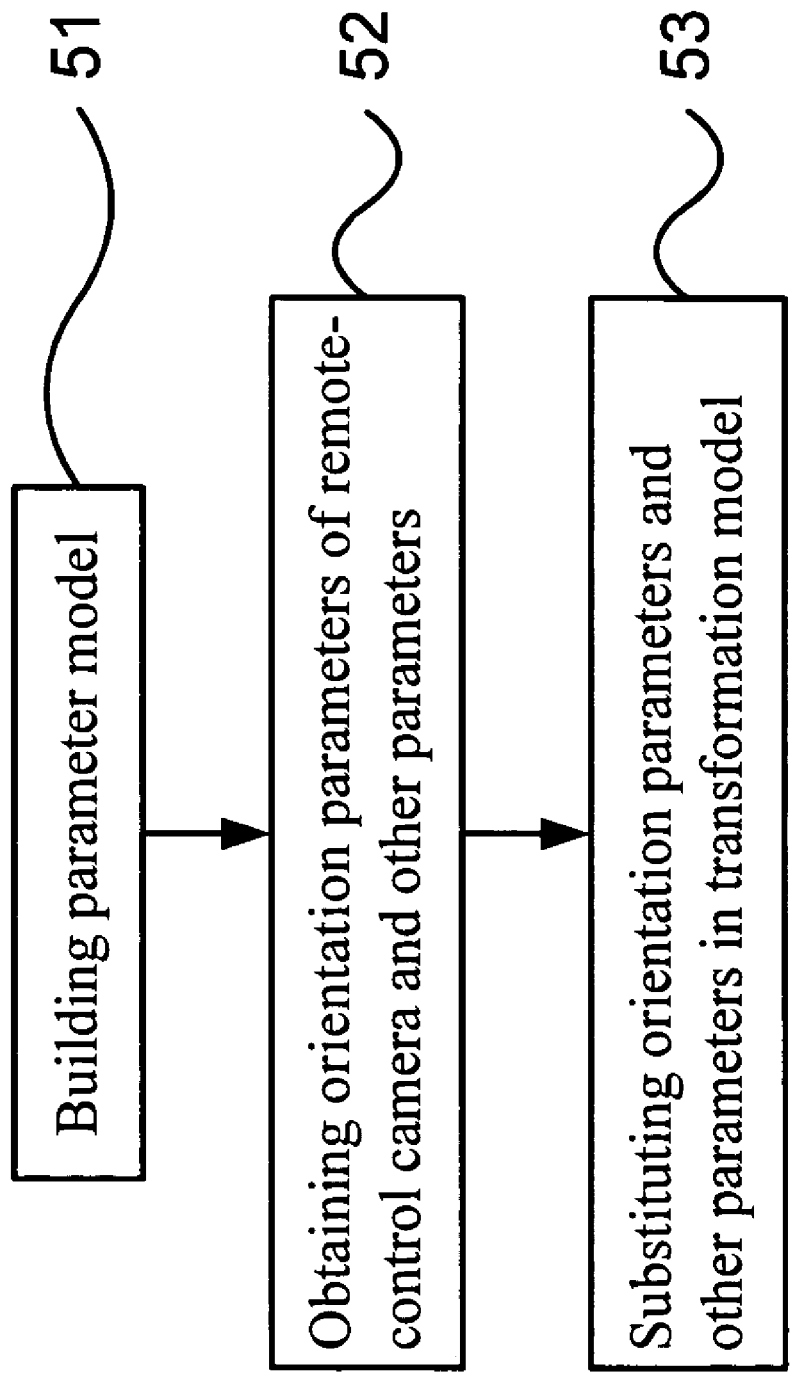
FIG. 4 is the flow view showing a method for building a transformation function between the image coordinates of the remote-control camera and the object coordinates of the digital map.

Please refer to FIG. 4, which is a flow view showing a method for building a transformation function between image coordinates of a remote-control camera and object coordinates of a digital map. As shown in the figure, no matter it is to position on an electronical map or to position a remote-control camera, a transformation function in a transformation module between image coordinates of the remote-control camera and object coordinates of the digital map is required. The transformation function are obtained through the following steps:

(k) Building a parameter model 51: A parameter model of panning, tilting and zooming for a remote-control camera is built through a bundle adjustment.

(l) Obtaining orientation parameters of the remote-control camera and other parameters 52: A plurality of control points of the remote-control camera is corresponding to a plurality of control points of the digital map separately and is obtained to figure out orientation parameters of the remote-control camera and calibration parameters of panning, tilting and zooming of the remote-control camera through a bundle adjustment based on a collinearity equation, where a great number of ray intersections are used to build a transformation model between the image coordinates of the remote-control camera and the object coordinates of the digital map.

(m) Substituting orientation parameters and other calibration parameters in the transformation model 53: The orientation parameters of the remote-control camera and the calibration parameters of panning, tilting and zooming of the remote-control camera obtained in the above step are substituted in the parameter model obtained in step (k) to build a transformation function between the image coordinates of the monitored position of the remote-control camera and the object coordinates of the digital map of the digital map module. The transformation function is obtained as follows:

$$x_a - x_p = -f \frac{\sum_{i=1}^{3} R_{1i} m_{i1}(X - X_c) + \sum_{i=1}^{3} R_{1i} m_{i2}(Y - Y_c) + \sum_{i=1}^{3} R_{1i} m_{i3}(Z - Z_c)}{\sum_{i=1}^{3} R_{3i} m_{i1}(X - X_c) + \sum_{i=1}^{3} R_{3i} m_{i2}(Y - Y_c) + \sum_{i=1}^{3} R_{3i} m_{i3}(Z - Z_c)}$$

$$y_a - y_p = -f \frac{\sum_{i=1}^{3} R_{2i} m_{i1}(X - X_c) + \sum_{i=1}^{3} R_{2i} m_{i2}(Y - Y_c) + \sum_{i=1}^{3} R_{2i} m_{i3}(Z - Z_c)}{\sum_{i=1}^{3} R_{3i} m_{i1}(X - X_c) + \sum_{i=1}^{3} R_{3i} m_{i2}(Y - Y_c) + \sum_{i=1}^{3} R_{3i} m_{i3}(Z - Z_c)},$$

where $x_a$ and $y_a$ are the image coordinates on an image plane of the remote-control camera; X, Y and Z are corresponding ground coordinates; $X_c$, $Y_c$ and $Z_c$ are object coordinates of a perspective center; $m_{11} \sim m_{33}$ forms a rotation parameter matrix of the remote-control camera including rotation angles to X-axis (ω), Y-axis (φ) and Z-axis (κ); f is a focal length on imaging; $x_p$ and $y_p$ are coordinates of a principle point which is an intersection point of an optical axis and the image plane; and $R_{11} \sim R_{33}$ are an additional rotation parameter matrix made of parameters of panning, tilting and additional calibration parameters.

To sum up, the present invention is a system for camera positioning and methods thereof, where a transformation function between image coordinates of a remote-control camera and object coordinates of a digital map is used and the object coordinates of the digital map is obtained through inputting the image coordinates of the remote-control camera or, likewise, the image coordinates of the remote-control camera is obtained through inputting the object coordinates of the digital map. Thus, a positioning function is obtained.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method for positioning on a digital map, comprising steps of:
   (a) transferring an image signal to an I/O module by a camera device, comprising a remote-control camera having parameters of panning, tilting and zooming, to be transformed into image data;
   (b) storing said image data in an image data base module and transferring said image data to be displayed by a display unit;
   (c) setting a monitored position in said image data, and transferring image coordinates of said monitored position to a transformation module;
   (d) transforming said image coordinates of said monitored position into object coordinates through said transformation module; and
   (e) inputting said object coordinates into a digital map module and displaying said monitored position and a digital map on said display unit,
   wherein said transformation module in step (d) processes transformations between said image coordinates of said monitored position of said remote-control camera and said object coordinates of said digital map of said digital map module according to a transformation function between said image coordinates and said object coordinates, wherein said transformation function is obtained through steps of:

(k) obtaining a parameter model of panning, tilting and zooming of said remote-control camera through a bundle adjustment;

(l) obtaining a plurality of control points of said remote-control camera separately corresponding to a plurality of control points of said digital map to obtain orientation parameters of said remote-control camera and calibration parameters of panning, tilting and zooming of said remote-control camera through a bundle adjustment;

(m) substituting said orientation parameters of said remote-control camera and said calibration parameters of panning, tilting and zooming of said remote-control camera obtained in step (l) into said parameter model obtained in step (k) to obtain said transformation function between said image coordinates of said monitored position of said remote-control camera and said object coordinates of said digital map of said digital map module.

2. The method according to claim 1, wherein said orientation parameters comprises object coordinates of said remote-control camera and rotation angles to X-axis, Y-axis, and Z-axis of said remote-control camera; and a focal length and a principle point coordinates on imaging.

* * * * *